United States Patent

Noa et al.

[11] 3,851,364
[45] Dec. 3, 1974

[54] AUTOMATIC TOOL CHANGING ARRANGEMENT

[75] Inventors: Fritz Noa, Rheydt; Manfred Mohren, Monchen-Gladbach, both of Germany

[73] Assignee: Schiess Aktiengesellschaft, Dusseldorf, Germany

[22] Filed: June 13, 1973

[21] Appl. No.: 369,752

[30] Foreign Application Priority Data
June 21, 1972 Germany.......................... 2230143

[52] U.S. Cl..................... 29/26 A, 29/568, 90/11 A, 90/11 D
[51] Int. Cl............................................ B23q 3/157
[58] Field of Search ............ 29/568, 26 A; 90/11 A, 90/11 D

[56] References Cited
UNITED STATES PATENTS
3,354,761    11/1967    Sadier............................ 29/568 X
3,466,739    9/1969    Harman............................... 29/568

Primary Examiner—Andrew R. Juhasz
Assistant Examiner—F. R. Bilinsky
Attorney, Agent, or Firm—Walter Becker

[57] ABSTRACT

An automatic tool changing arrangement for a machine tool in which a tool magazine nonrotatably supports tool heads. A spindle structure has a nonrotative housing with a sleeve rotatable and axially moveable therein. Cooperating elements of a bayonet latch on the tool head and one end of the sleeve are engageable and disengageable while the tool head is nonrotatively supported by the tool magazine by rotating the sleeve in the housing. Cooperating elements of clutch means on the housing and tool head are engageable and disengageable by axial movement of the sleeve in the housing while the bayonet latch is engaged. The sleeve may have a rotary spindle therein for driving rotary elements which may be provided in the tool head.

9 Claims, 10 Drawing Figures

AUTOMATIC TOOL CHANGING ARRANGEMENT

The present invention relates to a tool support with a chisel slide vertically movable therein, in which slide a sleeve is rotatably and axially displaceably mounted while the upper end of said sleeve is operatively connected to a rotary drive and the displacement drive, while a tool head with fixed tools and/or a rotatable tool is connectable to the lower end of said sleeve. More specifically, the present invention relates to a tool support of the just mentioned type, in which the tool head is adapted in a certain pivot position to be locked to the lower end of the chisel slide while a spindle extends through the sleeve in longitudinal direction thereof, which is journalled in the sleeve and adapted to be driven from the upper end, the lower end of said spindle engaging a rotary tool in case such tool is provided, on a machine tool, especially vertical rotary machine, which is provided with a changing magazine associated with the tool support for receiving tool heads which are equipped with different tools and which respectively have an outer annular groove for the radial engagement by one of the forks of the change magazine.

A tool support with a tool slide displaceable vertically therein of the above mentioned type has become known by the German Auslegeschrift No. 1,271,500 which, however, is not designed for cooperation with a change magazine associated therewith.

The association of a chisel slide with a change magazine has become known by the German Offenlegungsschrift No. 1,752,681 according to which, however, in contrast to the design of the above mentioned German Auslegeschrift a spindle sleeve or bushing does not pivot the tool head and is not chucked to the chisel slide. Instead there is provided a pull rod which extends axially through the slide and the lower end of which is adapted to be chucked to the exchangeable tool head.

It is an object of the present invention to provide a tool support with a chisel slide with tool head which slide is vertically displaceable and in which the tool head by the cooperation of the sleeve with the tool head and the chisel slide can be loosened and tightened in a simple manner and can be pivoted to certain positions in order to move the respective tool into working position.

It is a further object of this invention so to design the cooperation between the tool head and the sleeve that the tool head by moving to the change magazine can be received by one of the forks of said change magazine and inversely the chisel slide will from a fork of the change magazine take over another tool head and move the same toward the desired working position.

These and other objects and advantages of the invention will appear more clearly from the following specification in connection with the accompanying drawings, in which.

Figures 2, 3, 4:
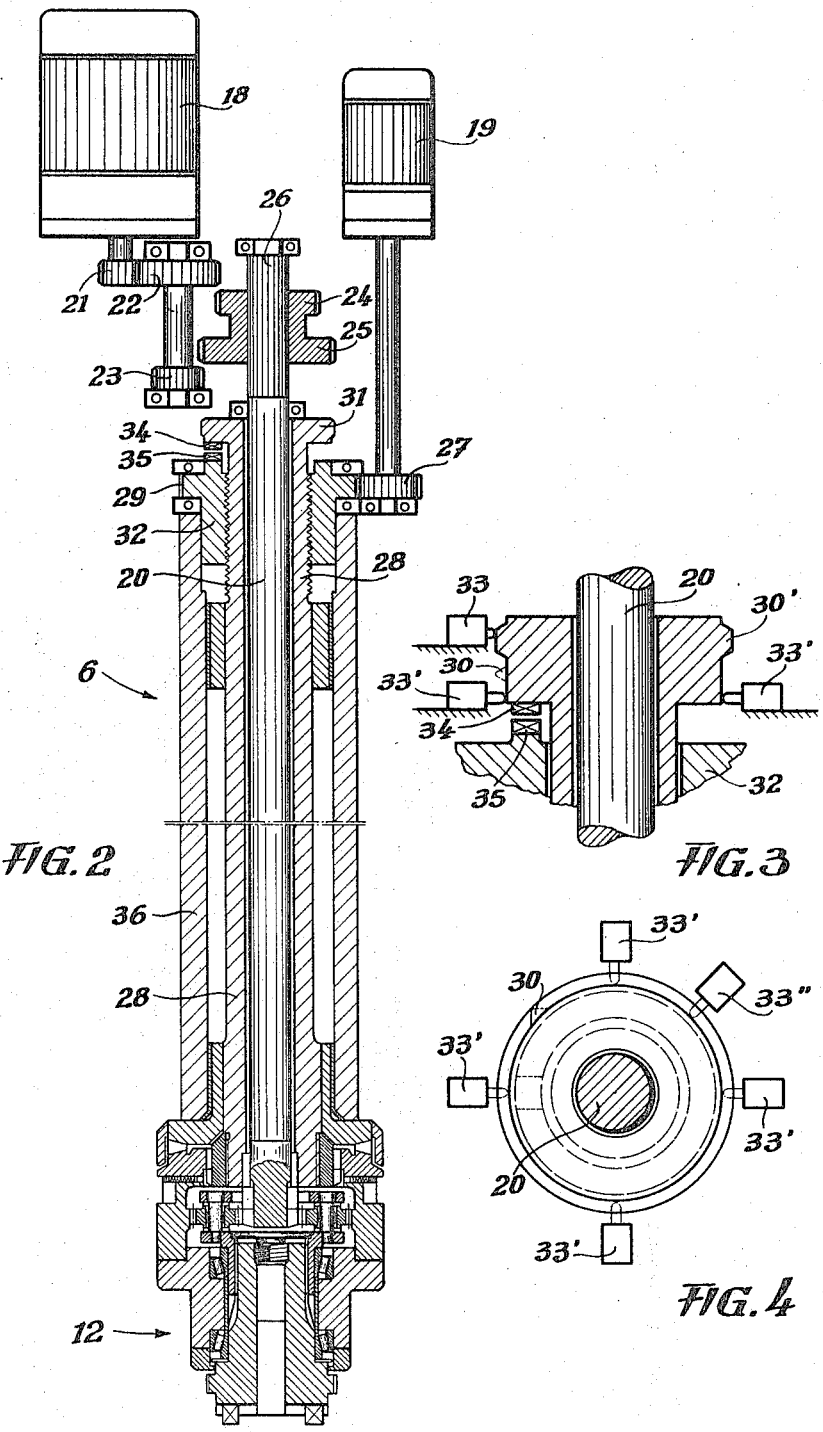
FIG. 2 illustrates a section through the chisel slide with a drive for the drilling and milling spindle and with an exchangeable tool head connected to the lower end of the chisel slide.

FIG. 3 diagrammatically illustrates on an enlarged scale a partial section through the upper end of the chisel slide.

FIG. 4 diagrammatically illustrates a top view of FIG. 3.

Figure 5:
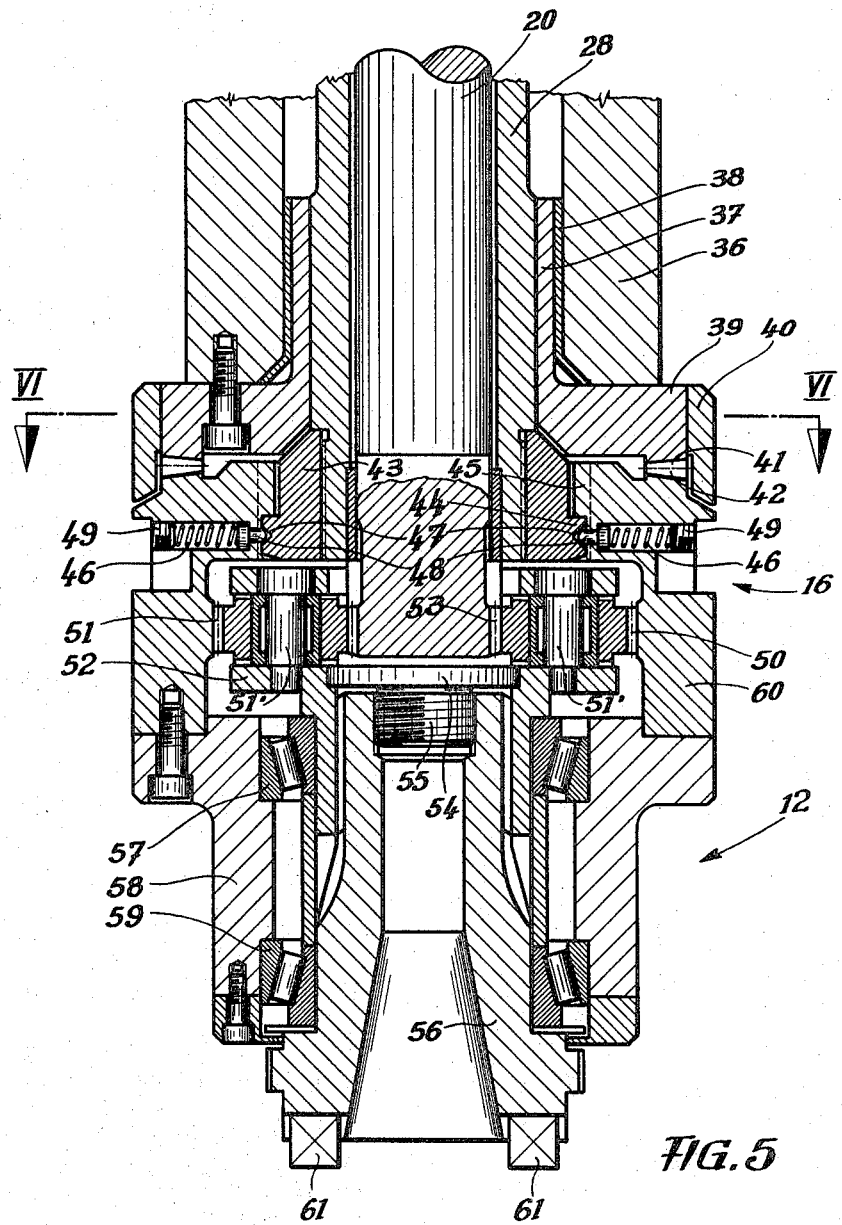

FIG. 5 illustrates on a larger scale than the preceding figures the lower end of the chisel slide with a tool head tightened thereon for receiving a rotating tool.

Figure 6:
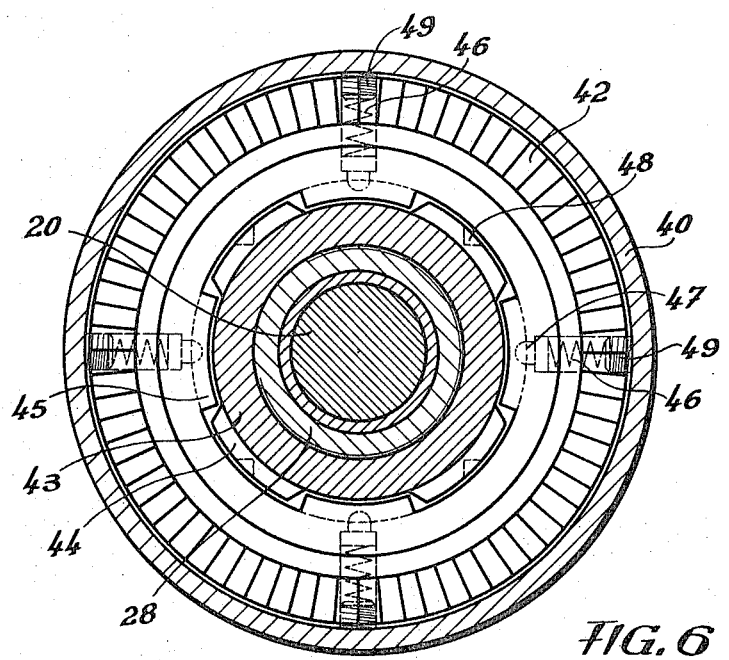

FIG. 6 is a section taken along the line VI—VI of FIG. 5 showing the tool head in its loosened position.

Figure 7:
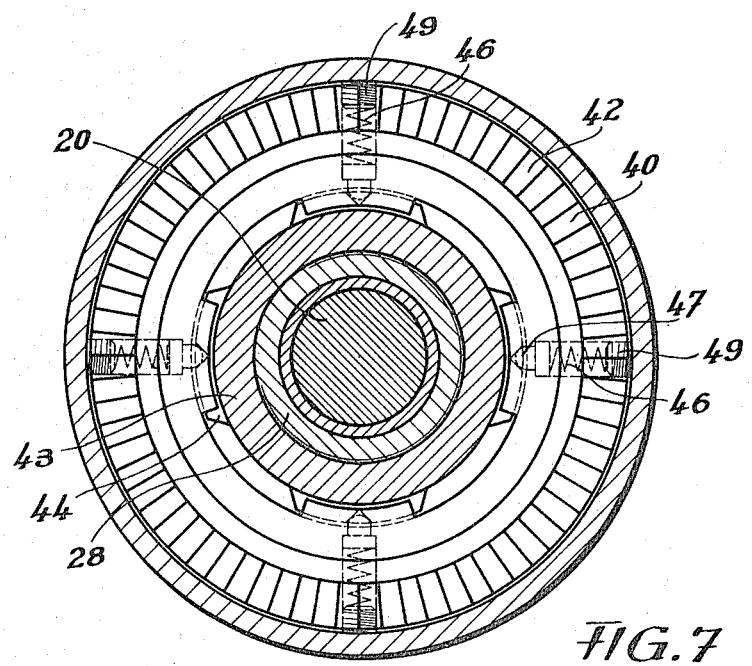

FIG. 7 likewise illustrates a section taken along the line VI—VI of FIG. 5, but shows the tool head in its connected position to the chisel slide.

Figure 8:
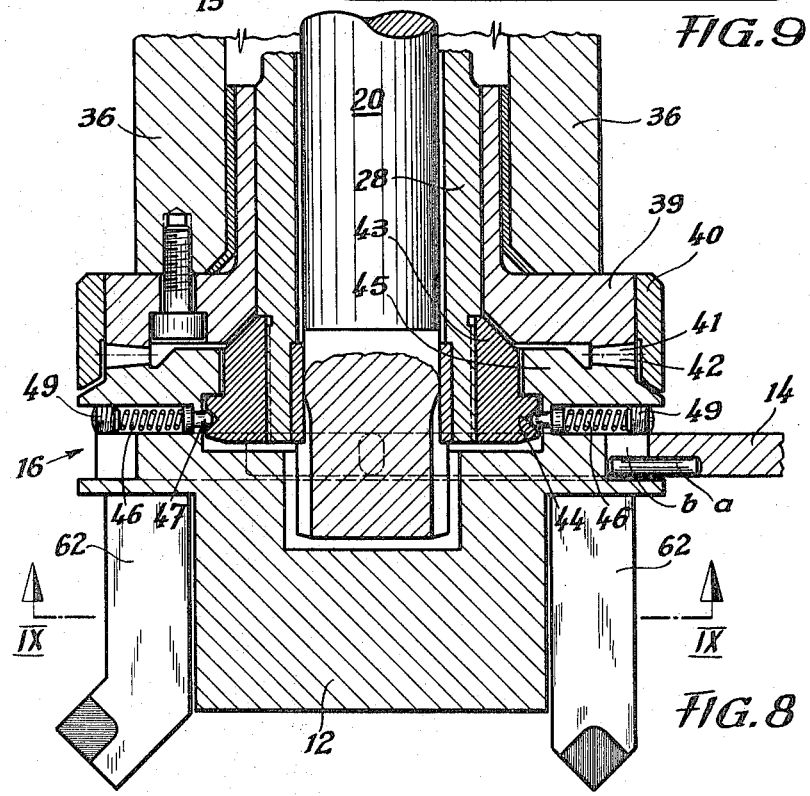

FIG. 8 is a section through the lower end of the chisel slide with a tool head connected thereto while engaging a receiving fork of the change magazine.

Figure 9:
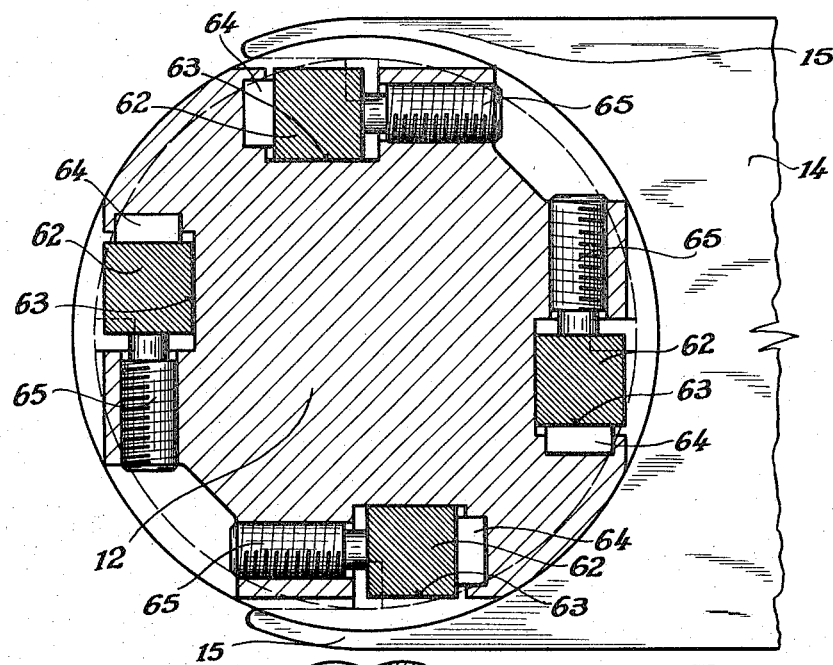

FIG. 9 is a section taken along the line IX—IX of FIG. 8.

Figure 10:
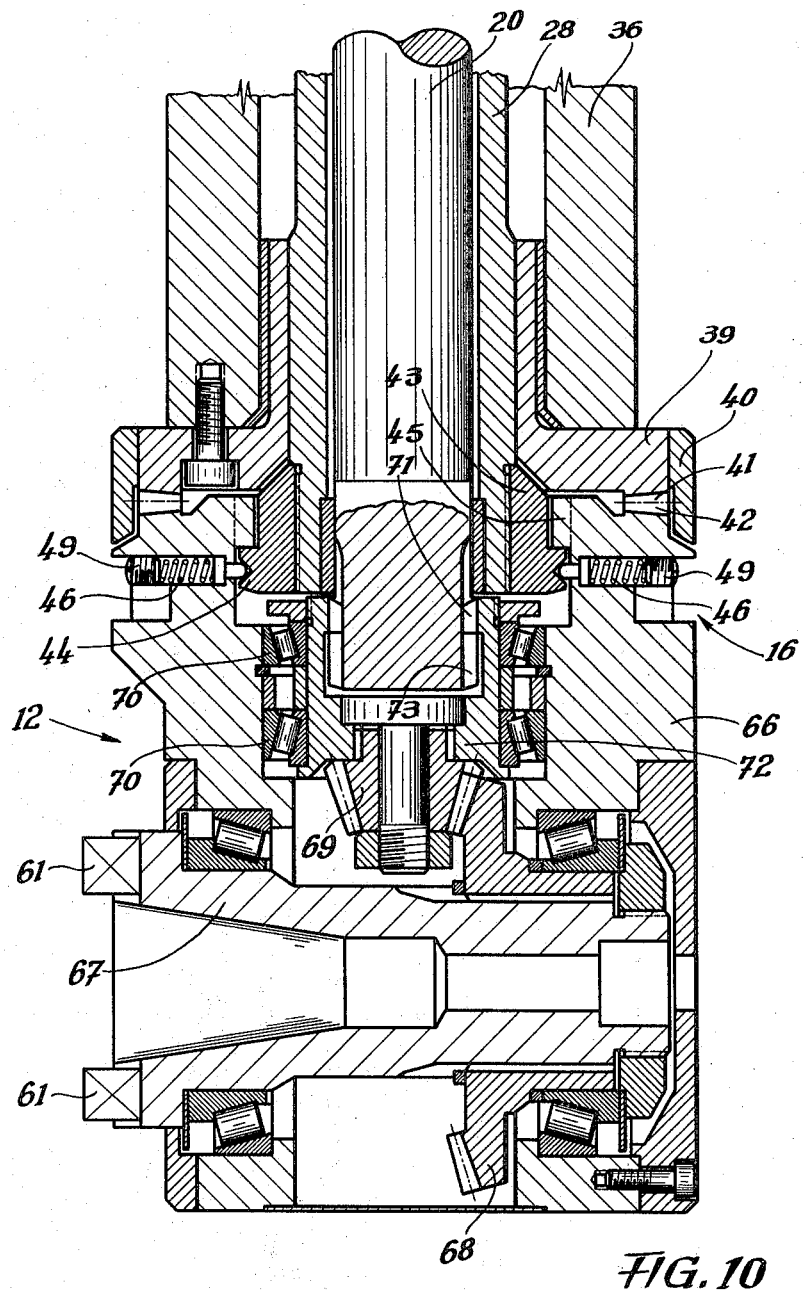

FIG. 10 is a section through the lower end of the chisel slide with a tool fixedly connected thereto for receiving a rotating tool.

The invention starts with the tool head comprising an annular groove in which a fork of the change magazine may be introduced so that the tool when detached from the chisel slide rests on the fork of the tool head or prior to its tightening rests on the chisel slide. The tool support according to the invention with a tool slide vertically displaceable therein of the above mentioned design on a machine tool having a change magazine associated with the tool support for receiving tool heads with different tools which engage an annular groove for radial engagement by the forks of the change magazine is characterized primarily in that a ring at the lower end of the sleeve has a number of radially outwardly directed teeth which are distributed over the circumference in a common plane and which in the driving position of the tool head extend below and engage radially inwardly directed teeth which are arranged on an embracing annular housing part of the tool head and which over the circumference are shorter than the tooth spaces on the ring at the lower end of the sleeve and which at their circumferential surface respectively have a recess which are yieldingly engaged in the resting position of the tool by spring loaded pins which are radially inwardly directed in the ring of the tool head.

In this way, a tool support is provided which has a vertically displaceable tool slide and which by turning the sleeve relative to the tool head permits a disengagement of the tool head and inversely permits a tightening of the tool head while with both operations, the tool head is supported in downward direction by the fork of the change magazine. Thus, for effecting a changing operation, the support is moved to the change magazine which latter in the disengaged position of the tool head takes over the support for the tool head. In view of the radially directed yieldable pin, it will always be assured that the tool head will with regard to the sleeve occupy the respective disengaging or arresting position. For the adjusting operations, respective limit switches may be provided the employment of which is known and is indicated for instance in the above mentioned German Auslegeschrift No. 1,271,500. Correspondingly, with the tool support according to the invention, the pivoting of the tool head to the various working positions and the pivoting of the sleeve with regard to the tool head, and the axial outward movement of the sleeve with tool head out of the slide can be controlled fully automatically and electrically without the necessity of requiring manual operation by an operator during the exchange of a tool head.

Figure 1:
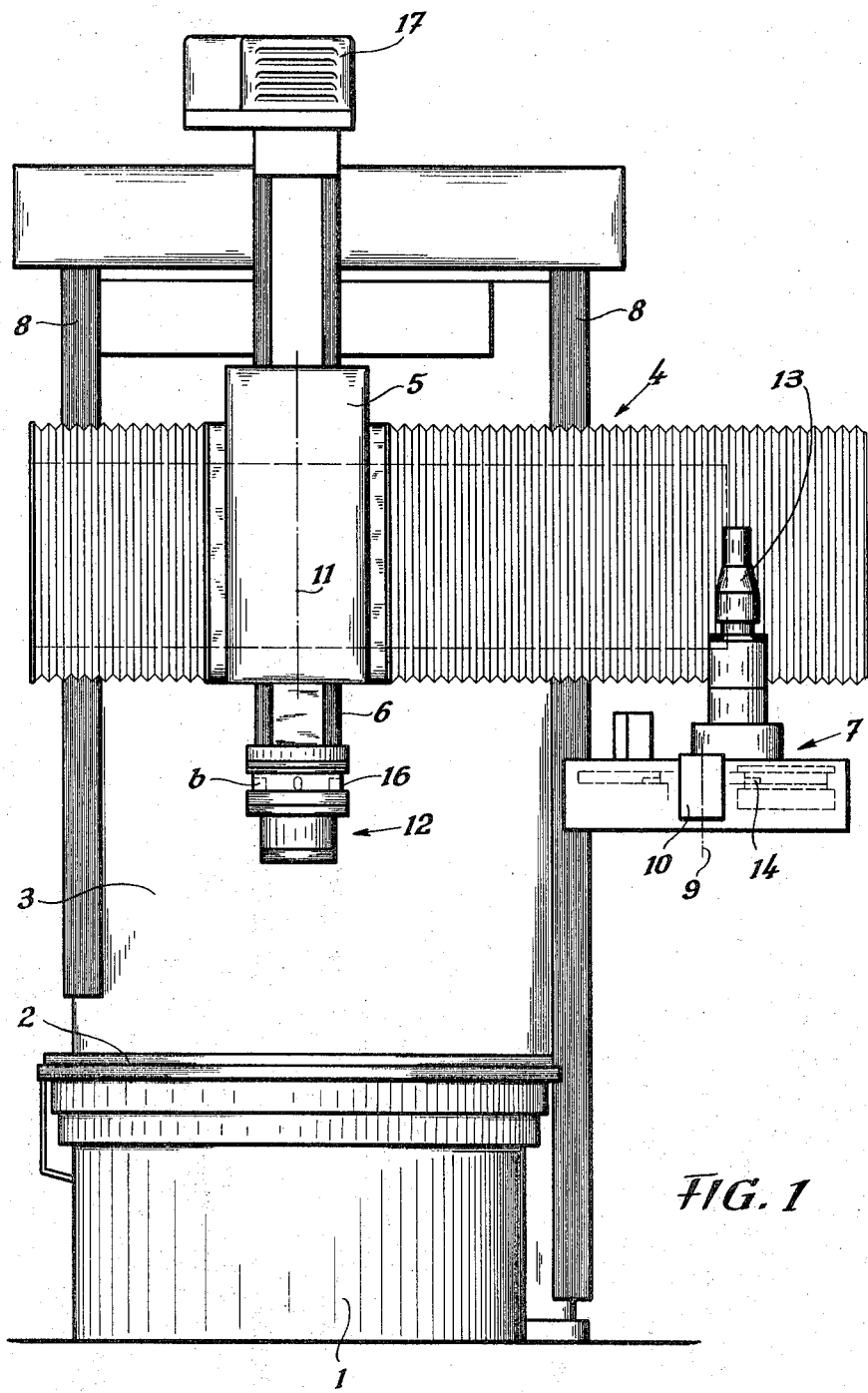
FIG. 1 illustrates a view of a vertical turning machine with a chisel slide provided on the transverse beam of the machine and with a change magazine for the tool heads.

Referring now to the drawings in detail, the vertical turning machine illustrated diagrammatically in FIG. 1 comprises a base 1 for the face plate 2 rotatably mounted on said base 1. The machine illustrated in FIG. 1 furthermore comprises a machine stand 3 with the transverse beam 4 which is vertically movable on said machine. The machine of FIG. 1 furthermore includes a support 5 which is displaceable on the transverse beam 4 and carries the chisel slide 6 and the change magazine 7 which latter is connected to one outer end of the transverse beam 4.

The transverse beam 4 is displaceable on the guiding strips 8 provided on the stand 3. The drive for these elements is not illustrated inasmuch as it may be of any standard construction. Similarly, the drive of the support for its longitudinal displacement on the transverse beam 4 is likewise not illustrated since also in this instance it may be of any desired standard type. The transverse beam 4 is at the side of the support 5 covered by a cover which can be telescopically pushed together and pulled apart and may be of any standard design in order to protect the sliding surfaces and the driving elements against soiling. The change magazine 7 is connected to the transverse beam 4 in such a way that the axis of rotation 9 of the magazine plate 10 is located in a plane which is parallel to the transverse beam 4 and in which also the axis of rotation 11 of the chisel slide 6 extends which latter has at its lower end disengageably connected thereto a tool head 12 which is illustrated in greater details in FIG. 5.

The magazine plate or dish 10 of the change magazine 7 is rotatable about the axis 9 for which purpose transmission motor 13 may be employed. The magazine plate 10 is circumferentially provided with a number of radially protruding forks 14 the fork ends 15 of which are illustrated on a larger scale in FIGS. 8 and 9. These fork ends 15 are so designed that the two fork ends 15 engage the groove 16 which extends all the way around the tool head 12. The fork ends 15 extend around the tool head 12 over an angle of approximately 180°. When a tool head 12 by a corresponding displacement of the chisel slide 6 is, in conformity with the height and by a corresponding displacement of the support 5 on the transverse beam 4, moved to the magazine plate 10 of the change magazine 7, the respectively provided fork 14 engages the groove 16 and partially embraces the tool head 12 so that the latter lies supported on fork 14 and is separated from the chisel slide 6 by disengaging the connection while simultaneously upwardly moving the chisel slide 6. If thereupon the magazine plate 10 is turned so that another tool head received thereby moves into the position facing the chisel slide 6, the chisel slide 6 will be able to receive this tool head 12 in such a way that it is first lowered onto the chisel slide 6 and connected thereto. Thereupon, the tool head is moved out of the fork 14 by displacing the chisel slide 6, and the tool head can now be used for machining the work piece on the face plate 2.

Details of the operations will be evident from FIG. 2 which illustrates on an enlarged scale a section through the chisel slide 6 of FIG. 1. Within the housing 17, there are provided two driving motors 18 and 19 with their respective transmissions. The motor 18 serves for driving the spindle 20 which is centrally arranged in the slide 6, if a rotary tool head 12 is provided, and through the pinion 21 drives the gears 22 and 23 with which the gears 24 and 25 may selectively be brought into mesh in order to impart upon the spindle one or the other of two different speeds. The gears 24 and 25 are adapted to be displaced together on the upper end of the spindle 20 which upper end is designed as a splined shaft. The turning of the tool head 12 is initiated in the following manner. The motor 19 with the driving pinion 27 serves for driving the spindle nut 32 which is provided with the gear 29 which is in engagement with the pinion 27 on the shaft of the motor 19. The spindle nut 32 engages an outer thread on sleeve 28 at the upper end thereof so that a turning of the spindle nut 32 results in a longitudinal displacement of the sleeve 28 in one or the other direction depending on the direction of rotation of the motor 19. The turning off of the motor 19, the changing in the direction of rotation of the motor 19, as well as the positioning of the tool head are controlled by means of limit switches 33 and 33' in conformity with FIGS. 3 and 4. The limit switches 33 and 33' have associated therewith at different heights a control cam 20 and a control ring 30' which are located on the flange 31 at the upper end of sleeve 28. When the motor 19 is turned on by a pressure switch and when the pinion 27 turns in one direction, the turning of the nut 32 brings about a downward movement of the sleeve 28 until the coupling member 34 on flange 31 engages the counter coupling member 35 at the upper end of the spindle nut 32. Thereupon, the spindle nut 32 and sleeve 28 will rotate together until this rotation is interrupted by the control cam 30 by the actuation of one of the selected and thereby function-ready limit switches 33' while simultaneously by reversing the direction of rotation of the motor 19 the sleeve 28 is again returned to its starting position. During the return movement, the control ring 30' will turn off a limit switch 33 on sleeve 28 which limit switch again turns off the motor 19. By means of a toggle switch at the operating station, a desired position of the tool head 12 may be preselected whereby the pertaining limit switch 33 will be placed into its function-ready position. The possible tool head positions are determined by the number of the provided limit switches 33'. According to the specific embodiment illustrated by way of example in the drawings, four positions are provided.

The cooperation between the tool head 12 and the lower end of sleeve 28 will now be explained in connection with FIG. 5. Within the region of the lower end of the outer sleeve 36 of chisel slide 6, the bushing 37 is firmly connected to the outer sleeve 36. The sleeve 28 is freely rotatably mounted in bushing 37. By means of a fitting bushing 38, the axes of the slide 6 and of sleeve 28 are precisely located. The bushing 37 is provided with the radially protruding flange 39 which latter is equipped with the axially protruding protective ring 40. Within the ring 40, the end face of flange 39 has spur gear teeth 41 for cooperation with counter spur gear teeth 42 on the tool head 12.

Screwed onto the lower end of sleeve 28 is a ring 43 which at the lower rim is provided with four radially directed teeth 44 which have wide tooth spaces and which have associated therewith corresponding radially inwardly directed teeth 45 on the tool head 12. These details are more clearly shown in FIGS. 6 and 7. According to FIG. 5, the teeth 44 engage the ring 43 of sleeve 28 below the teeth 45 on tool head 12 and, more specifically, exactly above each other. The movement of tool head 12 and ring 43 of sleeve 28 with each other will be established during the pivot movement by the fact that radially inwardly directed pins 47 under the influence of a spring 46 engage corresponding recesses 48 in teeth 44.

Within the region of the bores which are closed by the screws 49 and in which the spring 46 and pin 47 are located, there is provided the annular groove 16 referred to above in connection with FIG. 1. The interior of the tool head 12 is provided with a gear ring 50 engaged by planetary gears 51 which by means of the bearing bolts 51' are journalled in the bearing ring 52 within the tool head 12 and which are engaged by pinions 53 arranged in the lower end of spindle 20.

Below the lower end of spindle 20 in the operative position according to FIG. 5, a screw 55 is provided which is screwed into the hollow spindle 56. Hollow spindle 56 thus by means of the flange 54 of screw 55 rests on the planetary gear carrier 52 which by means of a multi-splined shaft connection is placed upon the hollow spindle 56 and by means of the anti-friction bearing 57 is journalled in the ring housing body 58 of the tool head 12. A further bearing 59 surrounds the lower end of the hollow spindle 56 which as a result thereof is also directly journalled in the ring housing body 58. The ring housing body 58 is connected to the ring housing part 60 which latter is equipped with inner teeth 50 and with the annular groove 16. As will be seen from FIG. 5, the spindle 20 when rotating will through pinion 53 drive the planetary gears 51 as a result of which due to the engagement of the inner teeth 50 brings about a rotation of the planetary gear carrier 52 within the head 12 so that the hollow spindle 56 will rotate correspondingly. The hollow spindle 56 has a conical inner profile for insertion of a rotary tool which is taken along by means of the follower 61 at the lower end of the hollow spindle 56.

The disengagement of the tool head 12 from sleeve 28 and disengagement from its ring 43 is effected in such a way that the support 5 with the slide 6 and the tool head 12 connected thereto is in changing position moved into the magazine plate 10 into a free radially extending fork 14. The pin $a$ connected to fork 14, which pin moves into one of the slots $b$ arranged in the annular groove 16 arrests the tool head 12 and at the same time prevents a turning thereof. After the motor 19 has been turned on as described above, the sleeve 28 moves downwardly until the coupling members 34 and 35 engage each other. Simultaneously, the spur gear teeth 41 and the counter spur gear 42 disengage each other whereupon the sleeve 28 is turned until the teeth 45 and 44 on ring 43 and at the upper ring housing 60 are staggered with regard to each other so that the pins 47 disengage the teeth 45. The turning off position is determined by the limit switch 33'' which occupies its function-ready position for the disengagement. Thus, the slide 6 can then be moved upwardly while disengaging the tool head 12. These operations require that the tool head 12 was first engaged by a fork 14 of the tool changer 7, in other words, that a fork 14 with its prongs 15 engages the annular groove 16 of the tool head 12 and prevents the same from dropping after the connection between the slide 6 and tool head 12 was disconnected within the region of the teeth 44 and 45.

The two positions of teeth 45 of ring 43 with regard to the teeth 44 on the ring housing part 60, as well as the respective engagement of pins 47 with the associated recesses in teeth 44 are clearly visible in FIGS. 6 and 7. The rotary movements in one or the other direction are disconnected respectively during the disengagement by the limit switch 33'' and the pivoting by the limit switch 33' according to FIGS. 3 and 4. The limit switch 33' cooperates with the control cam 30.

FIG. 8 illustrates a section through the lower end of a chisel slide 6 with a modified tool head 12 at the time the fork 14 of the magazine plate 10 is in active engagement. According to this embodiment, a tool head 12 is involved which is intended for receiving four tools 62 of different designs. These tools are inserted into pockets 63 at the circumference of the tool head 12 and are chucked in said pocket 63 by means of clamping jaws 64 and clamping screws 65. Depending on which of the tools 62 is to be used, the chucking of the tool head 12 to sleeve 28 is effected in corresponding rotary positions which are adjustable by means of the limit switches 33' in cooperation with the control cams 30 at the upper end of sleeve 28. Those members by means of which the tool head 12 engages the sleeve 28 correspond to those of the embodiment of FIG. 5.

Similar remarks also apply to the embodiment of FIG. 10 which illustrates a further embodiment of a tool head 12 connected to a chisel slide 6. The connection is again the same as with the previously mentioned and described embodiments. The tool head 12 illustrated in FIG. 10 serves for receiving a rotary tool which rotates about a horizontal axis, for which purpose, the hollow spindle 67 is journalled in horizontal position in the tool head housing 66. The gear 68 is firmly connected to the spindle 67 in the interior of the tool head housing 66; the gear 68 meshes with the pinion 69 which is rotatable about a vertical axis by means of anti-friction bearings 70 in the tool head housing 66. A bearing ring 72 engages by means of its teeth 73 the lower end of the spindle 20 while a teeth intermesh is superfluous when the tool head 12 is pulled downwardly in vertical direction and when a fork 14 of the magazine plate 10 engages the groove 16 and holds the tool head 12 fast while the slide 6 is moved vertically upwardly.

As will be evident from the above, the chisel slide 6 according to the invention makes possible an automatic tool head exchange in combination with a change magazine the magazine plate 10 of which is equipped with forks 14 adapted respectively to engage the annular groove 16 of the tool head 12. The particular design of the lower end of sleeve 28 and the parts of the tool head 12 associated therewith permit carrying out the connection and disconnection of the tool head 12 on slide 6 in an automatic manner without the necessity of engaging an operator on the tool slide. Moreover, the tool slide according to the invention affords the possibility of moving the tool head 12 into different pivoting or shifting positions depending on which type of tool head is to be mounted and which shifting position is required.

To summarize, if a tool head is to be removed from the tool support, the tool support moves to the tool magazine and introduces the tool head into a support fork. The fork provides support for the tool head and also holds the tool head against rotation.

Axial movement of the sleeve will now disengage the teeth which nonrotatably clutch the tool head to the housing of the tool support and, thereafter, rotation of the sleeve will disengage the teeth forming the bayonet latch that connects the tool head to the sleeve.

Axial movement of the tool support will now separate the tool support from the tool head, leaving the tool head in the tool magazine.

A tool head is taken from the magazine by following the steps described above in reverse order.

It is, of course, to be understood that the present invention is, by no means, limited to the particular showing in the drawings but also comprises any modifications within the scope of the appended claims.

What is claimed is:

1. In an automatic tool changing arrangement for a machine tool having a frame with a tool support therein adapted to operatively support a tool head for performing machining operations and a tool storage magazine, said magazine having at least one tool head engaging means adapted nonrotatively to engage a tool head and to support the tool head in a predetermined position, said tool support being moveable in said frame into registration with said tool head engaging means to receive a tool head therefrom or to deliver a tool head thereto, said tool support having a nonrotatable housing, a sleeve coaxially disposed in the housing, a nut rotatable but nonaxially moveable on one end of the housing threadedly engaging said sleeve, a tool head at the other end of said housing, cooperating elements of a bayonet latch on the tool head and sleeve engageable and disengageable in response to relative rotary movement of said tool head and sleeve, cooperating elements of clutch means on said tool head and the other end of said housing engageable and disengageable in response to relative axial movement of said tool head and housing, first means for rotating said nut to move said sleeve axially in said housing to engage or disengage said elements of clutch means associated with said nut, second means for rotating said sleeve in said housing while said tool head is nonrotatively engaged by said tool head engaging means on said magazine to engage or disengage said elements of a bayonet latch, and means operable while said elements of clutch means and bayonet latch are disengaged for moving said housing axially relative to said tool head engaging means.

2. An arrangement according to claim 1 which includes detent means operable for releasably latching said tool head to said sleeve in the relatively rotated position thereof in which said elements of a bayonet latch are engaged.

3. An arrangement according to claim 1 in which said elements of a bayonet latch comprise circumferentially spaced teeth on said sleeve and tool head formed on substantially the same pitch circle and facing each other, the teeth of each of said sleeve and tool head in disengaged position of the bayonet latch registering with the tooth spaces of the other so the teeth can pass by one another, the teeth of said sleeve in engaged position of the bayonet latch registering with the teeth of said tool head and engaging the ends of the teeth on the tool head on the side thereof facing away from said sleeve.

4. An arrangement according to claim 1 in which said cooperating elements of clutch means comprise axial teeth on said other end of said housing and on the side of the tool head facing said housing.

5. An arrangement according to claim 1 in which said first means comprises a motor drivingly connected to said nut.

6. An arrangement according to claim 1 in which said second means includes a clutch for nonrotatively connecting said sleeve to said nut.

7. An arrangement according to claim 1 which includes a rotary spindle coaxially disposed inside said sleeve and having axially extending circumferential teeth at the said other end of said housing for driving engagement with rotary elements in said tool head when such a tool head is connected to the housing and sleeve.

8. An arrangement according to claim 3 in which said teeth on said tool head comprise radial recesses about the sleeve axis, and spring loaded elements on said housing adapted to engage said recesses in engaged position of said bayonet latch.

9. An arrangement according to claim 1 in which said second means includes a clutch for nonrotatively connecting said nut to said sleeve for rotation of the nut and sleeve in unison during engagement and disengagement of said bayonet latch, and control means for controlling the rotated position of said sleeve and comprising switch means adjacent said nut and cam means on the nut engageable with the switch means in rotated positions of said nut while said nut is clutched to said sleeve.

* * * * *